US010995672B2

(12) United States Patent
Ramamurthi et al.

(10) Patent No.: US 10,995,672 B2
(45) Date of Patent: May 4, 2021

(54) ELECTRICAL WAVEFORM FOR GAS TURBINE IGNITER

(71) Applicant: General Electric Company, Schenectady, NY (US)

(72) Inventors: Badri Narayan Ramamurthi, Clifton Park, NY (US); Karim Younsi, Ballston Lake, NY (US); Andrey Meshkov, Schenectady, NY (US); Jason Fredrick Trotter, Glenville, NY (US); Timothy John Sommerer, Ballston Spa, NY (US); Ramanujam Ramabhadran, Schenectady, NY (US); Alvaro Alexander Briceno, Latham, NY (US); Charles Cook, Jacksonville, FL (US); Mark Wayne McWaters, Jacksonville, FL (US)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 16/033,942

(22) Filed: Jul. 12, 2018

(65) Prior Publication Data
US 2020/0018239 A1    Jan. 16, 2020

(51) Int. Cl.
*F02C 7/266*    (2006.01)
*H01T 15/00*   (2006.01)

(52) U.S. Cl.
CPC .............. *F02C 7/266* (2013.01); *H01T 15/00* (2013.01); *F05D 2220/32* (2013.01); *F05D 2260/99* (2013.01)

(58) Field of Classification Search
CPC ........... H01T 15/00; F02C 7/264; F02C 7/266
See application file for complete search history.

(56) References Cited

U.S. PATENT DOCUMENTS 4,129,895 A * 12/1978 Witting ................. F02P 3/0838
                                                     315/209 CD
4,399,779 A *  8/1983 Endo ........................ F02P 7/02
                                                     123/146.5 A
(Continued)

OTHER PUBLICATIONS

Dongwon Jung, Norimasa Iida, "An investigation of multiple spark discharge using multi-coil ignition system for improving thermal efficiency of lean SI engine operation," Applied Energy, 212 (2018) 322-332. Available online Dec. 22, 2017 (Year: 2017).*

(Continued)

*Primary Examiner* — Scott J Walthour
*Assistant Examiner* — David P. Olynick
(74) *Attorney, Agent, or Firm* — McGarry Bair PC (57) ABSTRACT

The present disclosure relates to gas turbine engine operation in which an igniter assembly is provided with an electrical energy input (e.g., an electrical waveform) that is configured to increase a likelihood of igniting a fuel-air mixture surrounding the igniter assembly. In certain embodiments, the igniter assembly is supplied with an augmented electrical waveform that may reduce a quantity of sparks generated by the igniter assembly before successful light-off (e.g., ignition) of the fuel-air mixture is achieved (e.g., as compared to a quantity of sparks generated to achieve ignition by an igniter assembly that receives an electrical energy input in the form of a conventional electrical waveform). Accordingly, the augmented electrical waveform may reduce wear (e.g., via oxidation) on electrodes of the igniter assembly, such as a primary electrode (e.g., a center electrode) and a secondary electrode (e.g., an outer shell electrode) disposed about the primary electrode.

20 Claims, 6 Drawing Sheets

(56) References Cited

U.S. PATENT DOCUMENTS

| | | | |
|---|---|---|---|
| 5,315,982 A | | 5/1994 | Ward et al. |
| 5,456,241 A | | 10/1995 | Ward |
| 5,689,949 A | | 11/1997 | Defreitas et al. |
| 5,754,011 A | * | 5/1998 | Frus ............... F02P 3/0869 |
| | | | 315/209 SC |
| 5,936,830 A | | 8/1999 | Rousseau et al. |
| 6,321,733 B1 | | 11/2001 | Suckewer et al. |
| 6,474,321 B1 | | 11/2002 | Suckewer et al. |
| 7,467,612 B2 | | 12/2008 | Suckewer et al. |
| 7,509,812 B2 | | 3/2009 | Mehrer et al. |
| 8,050,848 B2 | | 11/2011 | Huschenbett et al. |
| 8,622,041 B2 | | 1/2014 | Suckewer et al. |
| 9,267,439 B2 | | 2/2016 | Corson et al. |
| 2005/0116703 A1 | * | 6/2005 | Masters ............... F02P 3/045 |
| | | | 324/169 |
| 2006/0037326 A1 | * | 2/2006 | Mehrer ............... F02C 7/264 |
| | | | 60/776 |
| 2006/0137354 A1 | * | 6/2006 | Ponziani ............. F02C 7/266 |
| | | | 60/772 |
| 2014/0076295 A1 | * | 3/2014 | Zheng ................. F02P 15/10 |
| | | | 123/621 |
| 2015/0300312 A1 | * | 10/2015 | Ferguson ............. F02P 15/02 |
| | | | 123/406.12 |
| 2016/0013623 A1 | * | 1/2016 | Zheng .................. H01T 19/04 |
| | | | 361/263 |
| 2016/0102647 A1 | * | 4/2016 | Hashimoto ......... F02P 9/007 |
| | | | 315/283 |
| 2018/0058414 A1 | * | 3/2018 | Tang .................... F02P 3/045 |
| 2018/0363618 A1 | * | 12/2018 | Kinoshita ............. F02P 3/01 |

OTHER PUBLICATIONS

Sjöberg, M., Zeng, W., Singleton, D., Sanders, J. et al., "Combined Effects of Multi-Pulse Transient Plasma Ignition and Intake Heating on Lean Limits of Well-Mixed E85 DISI Engine Operation," SAE Int. J. Engines 7(4):2014, doi:10.4271/2014-01-2615. (Year: 2014).*

Magnus Sjöberg, Wei Zeng, Martin Gundersen, Dan Singleton and Jason Sanders, "Combined Effects of Multi-Pulse Transient Plasma Ignition and Intake Heating on Lean Limits of Well-mixed E85 SI Engine Operation," SAND2014-1536C, AEC Program Review Meeting Feb. 11-13, 2014 at Sandia. (Year: 2014).*

Naegeli, David W., et al.; "Ignition Study in a Gas Turbine Combustor", Combustion Science and Technology, vol. 80, Issue:4-6, pp. 165-184, 1991.

Mahajan, Deepak Pitambar, et al.; "Novel exciter circuit for ignition of gas turbine engines in aerospace applications", 2013 IEEE International Conference on Industrial Technology (ICIT), pp. 613-617, Location: Cape Town, Feb. 2013.

* cited by examiner

ELECTRICAL WAVEFORM FOR GAS TURBINE IGNITER

BACKGROUND

The subject matter disclosed herein relates to an electrical waveform for an igniter of a gas turbine combustor.

Gas turbine engines typically include a combustor configured to ignite and combust a fuel-air mixture, thereby generating hot pressurized exhaust gas. The hot pressurized exhaust gas may be used to drive a turbine rotor to rotate, and the turbine rotor, in turn, may drive a compressor rotor to rotate (e.g., via a shaft coupled to the turbine rotor and the compressor rotor). Rotation of the compressor rotor may generate warm pressurized air, which may be combined with fuel and provided to the combustor for ignition and combustion.

The fuel-air mixture within the combustor is typically ignited by one or more igniter assemblies in fluid communication with an interior of the combustor. For example, the igniter assemblies may include electrodes configured to ionize gas in response to an electrical voltage applied to one or both of the electrodes. In particular, a primary electrode of the igniter assembly may receive an abrupt electrical voltage (e.g., an electrical pulse or a single current-voltage waveform) that generates an electrical current through the gas between the primary electrode and the secondary electrode, thus ionizing a volume of the gas therebetween. The ionized gas (e.g., plasma) is emitted from the igniter assembly and intersperses with the fuel-air mixture within the interior of the combustor, which may initiate combustion of the fuel-air mixture. It is known that higher spark energy increases the probability that a spark will initiate stable combustion within the combustor. However, higher spark energy may cause the electrodes to incur wear, thereby undesirably increasing the frequency of maintenance operations (e.g., removal and replacement of the igniter assembly).

BRIEF DESCRIPTION

In one embodiment, an igniter assembly for a gas turbine combustor is provided. In accordance with this embodiment, the igniter assembly includes: a first electrode, a second electrode, and an insulator, which collectively form a cavity, wherein the second electrode forms an outlet passage extending into a flow path defined by the gas turbine combustor; and a waveform generation module electrically coupled to the first electrode or the second electrode and configured to supply an electrical waveform comprising a plurality of bursts, wherein each burst generates an ignition event when supplied to the first electrode or the second electrode, wherein the plurality of bursts are separated from one another by an intermissive period between sequential bursts, wherein each burst comprises a pair of electrical pulses separated by a pulse spacing between 0.1 milliseconds and 10 milliseconds, and wherein the first electrode and the second electrode are configured to ionize gas within the cavity in response to each electrical pulse of the pair of electrical pulses supplied to the first electrode or the second electrode, such that the first electrode and the second electrode generate a pair of ionized gas plumes during each ignition event.

In another embodiment a method of operating an igniter assembly for a combustor of a gas turbine engine is provided. In accordance with this method, an electrical waveform comprising a plurality of bursts is generated via a waveform generator. The plurality of bursts are separated from one another by an intermissive period between sequential bursts. The electrical waveform is supplied to an electrode of the igniter assembly to generate an ignition event in response to each burst. Each burst comprises a pair of electrical pulses separated by a pulse spacing less than 10 milliseconds. Each electrical pulse of the pair of electrical pulses enables the electrode to ionize a gas interspersed between the electrode and an additional electrode disposed adjacent the electrode, such that the electrode generates a pair of ionized gas plumes during the ignition event that expand into a fuel-air mixture within the combustor. Supply of the electrical waveform to the igniter assembly is discontinued in response to determining that the pair of ionized gas plumes induce light-off of the fuel-air mixture.

In a further embodiment an igniter assembly for a gas turbine system is provided. In accordance with this embodiment, the igniter assembly includes: a pair of electrodes surrounding an insulator, wherein the pair of electrodes and the insulator form a cavity comprising an outlet passage in fluid communication with a flow path of the gas turbine system, wherein the pair of electrodes are configured to ionize a gas within the cavity and exhaust plumes of the ionized gas through the outlet passage and into the flow path in response to an electrical current applied to an electrode of the pair of electrodes; and a waveform generation module configured to supply the electrical current to the electrode as an electrical waveform comprising a plurality of bursts, wherein the plurality of bursts are separated from one another by an intermissive period between sequential bursts, wherein each burst defines an ignition event and comprises a plurality of electrical pulses, wherein the plurality of electrical pulses are separated from one another by a pulse spacing less than 10 milliseconds, and wherein each electrical pulse enables the pair of electrodes to generate a respective plume of the ionized gas that discharges through the outlet passage, such that the ignition event generates a plurality of ionized gas plumes disposed proximate to one another and each corresponding to a respective electrical pulse.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may enhance gas turbine engine operation by providing an igniter assembly with an electrical energy input (e.g., an electrical waveform) that is configured to increase a likelihood of igniting a fuel-air mixture surrounding the igniter assembly. For example, in certain embodiments, the igniter assembly is supplied with an augmented electrical waveform that may reduce the energy of each spark or quantity of sparks generated by the igniter assembly before successful light-off (e.g., ignition) of the fuel-air mixture is achieved (e.g., as compared to an energy of each spark or quantity of sparks generated to achieve ignition by an igniter assembly that receives an electrical energy input in the form of a conventional electrical waveform). Accordingly, the augmented electrical waveform may reduce wear (e.g., via evaporation, oxidation, or spallation) on electrodes of the igniter assembly, such as a primary electrode (e.g., a center electrode) and a secondary electrode (e.g., an outer shell electrode) disposed about the primary electrode. As a result, a frequency of maintenance operations on the igniter assembly may be reduced.

The augmented electrical waveform includes a waveform profile that may repeat cyclically after lapse of a predetermined time interval, or complete a single cycle. Each cycle or cyclical repetition of the waveform profile will be referred to herein as a "burst" of the electrical waveform or, in other words, a burst of the electrical energy input. The waveform profile of the augmented electrical waveform includes a plurality of electrical pulses (e.g., energy peaks), in contrast to conventional waveform profiles, which typically include a single electrical pulse. Accordingly, the augmented electrical waveform may intermittently deliver multiple peak electrical current discharges to the igniter assembly during every burst of the waveform, where each peak electrical current discharge enables the igniter assembly to generate a spark. The igniter assembly generates a plume of ionized gas via each spark, which extends into the fuel-air mixture within the combustor, which surrounds the igniter assembly. For clarity, it should be noted that throughout the following discussion, a "plume" refers to a region of hot gas that is generated in response to an electrical pulse, such as an electrical spark, extending between electrodes of the igniter assembly. The gas in the combustor is typically flowing along a combustor wall, as part of a gas recirculation pattern in the combustor, generally perpendicular to the direction the movement of the plume out of an igniter cavity of the igniter assembly, and the plume is carried along with the gas flow. A typical gas flow speed near the igniter assembly is about 150 feet per second. Because of the multi-pulse architecture of the augmented electrical waveform, the plumes of ionized gas may be generated in close proximity to one another, which facilitates interaction between the plumes.

For example, a preceding plume of ionized gas and a subsequent plume of ionized gas may be disposed substantially adjacent to one another or partially overlap with one another if the time between plumes is sufficiently short, in comparison with the plume size and the combustor gas flow speed. As described in greater detail herein, such an arrangement of the plumes of ionized gas may enhance an ignition likelihood of the fuel-air mixture surrounding the igniter assembly as compared to igniter assemblies supplied with a conventional electrical waveform, which typical generate a single, relatively large plume of ionized gas. The augmented electrical waveform may thus enable the igniter assembly to induce ignition of the fuel-air mixture using a significantly lesser total energy or quantity of bursts than the energy or quantity of bursts provided when inducing ignition of the fuel-air mixture by supplying the conventional electrical waveform to the igniter assembly. Accordingly, even though the augmented electrical waveform provides multiple electrical pulses to the igniter assembly during every burst of the augmented electrical waveform, when supplied to the igniter assembly, the augmented electrical waveform may enable the igniter assembly to ignite the fuel-air mixture using a less total energy or a fewer total quantity of sparks than the conventional electrical waveform.

In certain embodiments, an amount of electrical energy supplied to the igniter assembly during each burst of the augmented electrical waveform may be substantially similar to an amount of electrical energy supplied to the igniter assembly during each burst of a conventional electrical waveform. However, as noted above, a quantity of sparks generated by the igniter assembly during a burst supplied by the augmented electrical waveform may be larger than a quantity of sparks generated during a burst supplied by the conventional electrical waveform (e.g., due to the multi-pulse architecture of the augmented electrical waveform). Accordingly, an amount of electrical energy discharged between the electrodes of the igniter assembly during each spark generated via the augmented electrical waveform may be less than an amount of electrical energy discharged between the electrodes during each spark generated via the conventional electrical waveform. Decreasing an electrical energy discharge per individual spark of the igniter assembly may further enhance an operational life of the electrodes, for example, by reducing wear on the electrodes due to evaporation, oxidation, spallation, and/or material fatigue (e.g., from thermal loading). Accordingly, the augmented electrical waveform may enhance an operation life span of the igniter assembly (e.g., an operational time before removal and replacement of the igniter assembly). These and other features will be described below with reference to the drawings.

Figure 1:
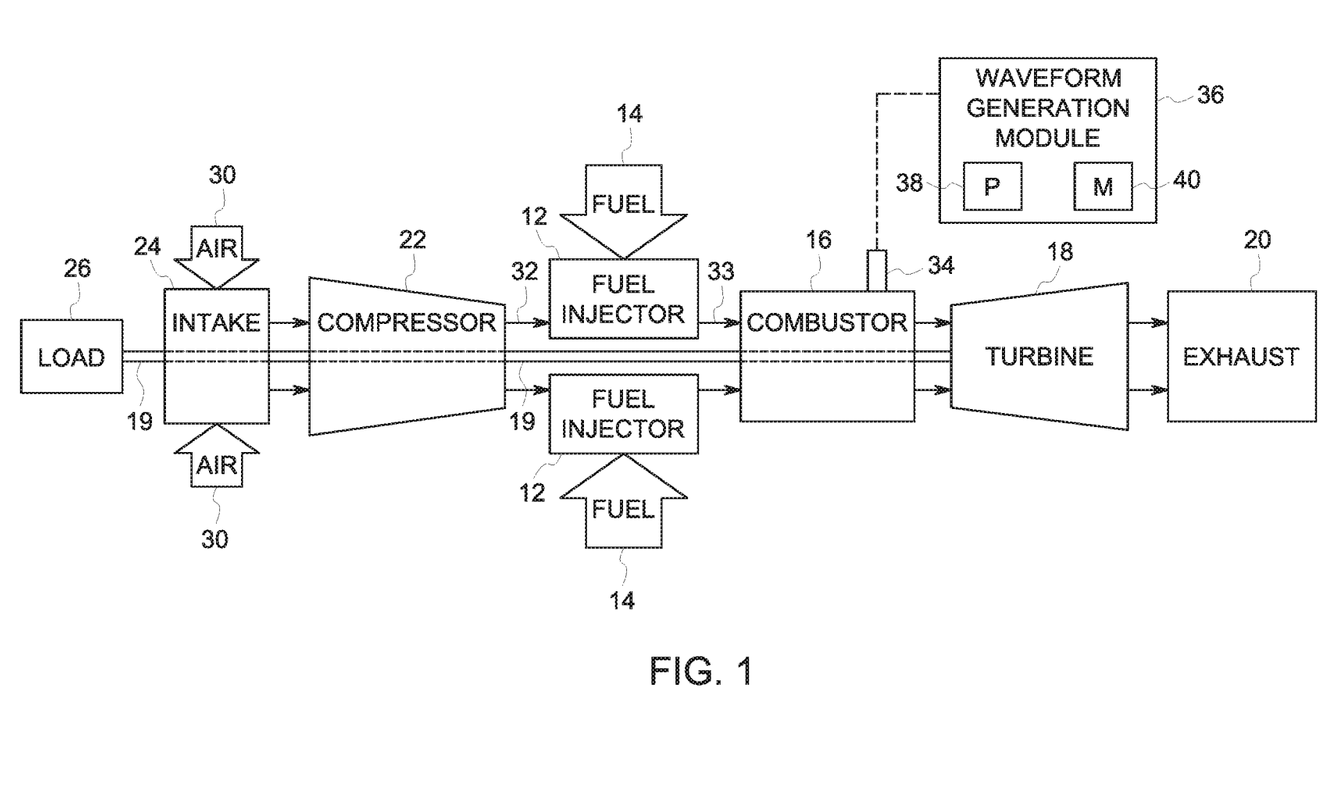
FIG. 1 is a block diagram of an embodiment of a gas turbine system, including an igniter assembly configured to initiate combustion of a fuel-air mixture within a combustor.

Turning now to the drawings, FIG. 1 is a block diagram of an embodiment of a turbine system 10 (e.g., gas turbine system, turbine engine, gas turbine engine), including an igniter assembly configured to initiate combustion of a fuel-air mixture within a combustor. The gas turbine system 10 includes a fuel nozzle/injector 12, a fuel supply 14, and a combustor 16. As illustrated, the fuel supply 14 routes a liquid fuel and/or gas fuel, such as jet fuel, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. The turbine 18 includes one or more stators having fixed vanes or blades, and one or more rotors having blades that rotate relative to the stators. The exhaust gas passes through the turbine rotor blades, thereby driving the turbine rotor to rotate. Coupling between the turbine rotor and a shaft 19 induces rotation of the shaft 19, which is also coupled to several components throughout the gas turbine system 10, as illustrated. Eventually, the exhaust of the combustion process exits the gas turbine system 10 via an exhaust outlet 20.

A compressor 22 includes blades rigidly mounted to a rotor, which is driven to rotate by the shaft 19. As air passes through the rotating blades, air pressure increases, thereby providing the combustor 16 with sufficient air for proper combustion. The compressor 22 intakes air to the gas turbine system 10 via an air intake 24. Further, the shaft 19 may be coupled to a load 26, which is powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. For example, the fuel injector 12 may inject the compressed air 32 and fuel 14, as a fuel-air mixture 33, into the combustor 16. Alternatively, the compressed air 32 and fuel 14 may be injected directly into the combustor 16 for mixing and combustion.

In the illustrated embodiment, the combustor 16 includes an igniter assembly 34 configured to initiate combustion of the fuel-air mixture. In certain embodiments, the igniter assembly 34 includes a first electrode (e.g., center electrode), a second electrode (e.g., outer shell electrode), and an insulator. The first electrode, the second electrode, and the insulator form a cavity, and the second electrode forms an outlet passage extending from the cavity. The first electrode and the second electrode are configured to ionize gas within the cavity and, in certain embodiments, within the outlet passage in response to an electrical current applied to the first electrode or to the second electrode. The ionized gas flows from the outlet passage and forms a plume (e.g., a plasma plume) extending into a combustion zone within the combustor 16.

As noted above, the electrical current is applied to the first or second electrodes in the form of an electrical waveform, which includes pre-configured cyclical fluctuations in electrical current and/or voltage. For example, each cycle of the electrical waveform may include electrical pulses (e.g., spikes in electrical current and/or voltage) that occur in target intervals relative to one another and discharge a predetermined amount of electrical energy in a given time (e.g., power) to the igniter assembly 34. As described in greater detail herein, a magnitude, duration, and/or spacing of the pulses relative to one another may be arranged to facilitate ionization of the gas and ignition of the fuel-air mixture within the combustor 16.

The igniter assembly 34 may be electrically coupled to a waveform generation module 36 (e.g., a function generator, a waveform generator) that is configured to generate the electrical waveform and supply the electrical waveform to the first electrode or the second electrode. In some embodiments, the waveform generation module 36 includes integrated circuitry having certain electrical components (e.g., voltage comparators, operational amplifiers, capacitors, and so forth) that are configured to generate a predetermined waveform profile (e.g., a sinusoidal wave, a square wave, a saw-tooth wave, a triangular wave, etc.). Accordingly, the waveform generation module 36 may supply a particular waveform to the igniter assembly 34 during operation of the gas turbine system 10. As a non-limiting example, the waveform generation module 36 may include a rectifier and a transformer that are configured to convent electrical power from an alternating current power source that supplies a voltage of 115 Volts at frequency of 400 Hertz to direct current power having a voltage of approximately 5 kilo-Volts. The direct current power may be used to charge a set of capacitors over a period of approximately 1 second. A spark-gap may close after the capacitors reach a predetermined voltage (e.g., 3 kilo-Volts), and thus, electrically couple the capacitors to the igniter assembly 34. In some cases, additional capacitors, inductors, and transformer elements may be used to increase the voltage received by the igniter assembly 34 to approximately 10 kilo-volts, and thus, facilitate generating a spark between the electrodes of the igniter assembly 34 that induces breakdown (e.g., ionization) of gas surrounding the electrodes. The spark may last through a time period during which the capacitor discharges (e.g., between 10 micro-second and 50 microseconds).

In some embodiments, the waveform generation module 36 may include a processor 38, such as a microprocessor, which may execute software for controlling integrated circuitry of the waveform generation module 36, and thus, enable the waveform generation module 36 to modify certain parameters of the electrical waveform. The processor 38 may include multiple microprocessors, a "general-purpose" microprocessor, a special-purpose microprocessor, an application specific integrated circuit (ASICS), a reduced instruction set (RISC) processor, or some combination thereof.

The waveform generation module 36 may also include a memory device 40 that may store information such as control software, look up tables, configuration data, etc. The memory device 40 may include a volatile memory, such as random access memory (RAM), and/or a nonvolatile memory, such as read-only memory (ROM). The memory device 40 may store a variety of information and may be used for various purposes. For example, the memory device 40 may store processor-executable instructions including firmware or software for the processor 38 to execute, such as instructions for generating the electrical waveform and adjusting certain parameters of the electrical waveform. In some embodiments, the memory device 40 is a tangible, non-transitory, machine-readable-medium that may store machine-readable instructions for the processor 38 to execute. The memory device 40 may include ROM, flash memory, a hard drive, or any other suitable optical, magnetic, or solid-state storage medium, or a combination thereof. Accordingly, the memory device 40 may store instructions and any other suitable data.

The processor 38 may facilitate controlling certain electrical components of the waveform generation module 36 (e.g., potentiometers, voltage regulators, current regulators, etc.) that enable the waveform generation module 36 to generate transitory waveforms. Such transitory waveforms include a waveform profile that may be adjusted during operation of the igniter assembly 34. In some embodiments, the waveform profile may be adjusted in response to deviations in certain operational parameters of the gas turbine system 10, which may be measured through one or more sensors communicatively coupled to the waveform generation module 36. For example, the waveform generation module 36 may modify parameters of the electrical waveform (e.g., a current and/or voltage magnitude of the electrical pulses) in response to an ambient pressure of gas within the combustor 16, a temperature of the combustor 16, a flow rate of gas through the combustor 16, or any other suitable operational parameter, or combination of operational parameters of the gas turbine system 10. Accordingly, one of ordinary skill in the art would readily appreciated that the waveform generation module 36 may include any suitable waveform generation system that is configured to generate and supply a desired electrical waveform to the igniter assembly 34, as well as regulate a magnitude of the voltage and/or electrical current supplied to the igniter assembly 34 via each of the generated waveforms.

Figure 2:
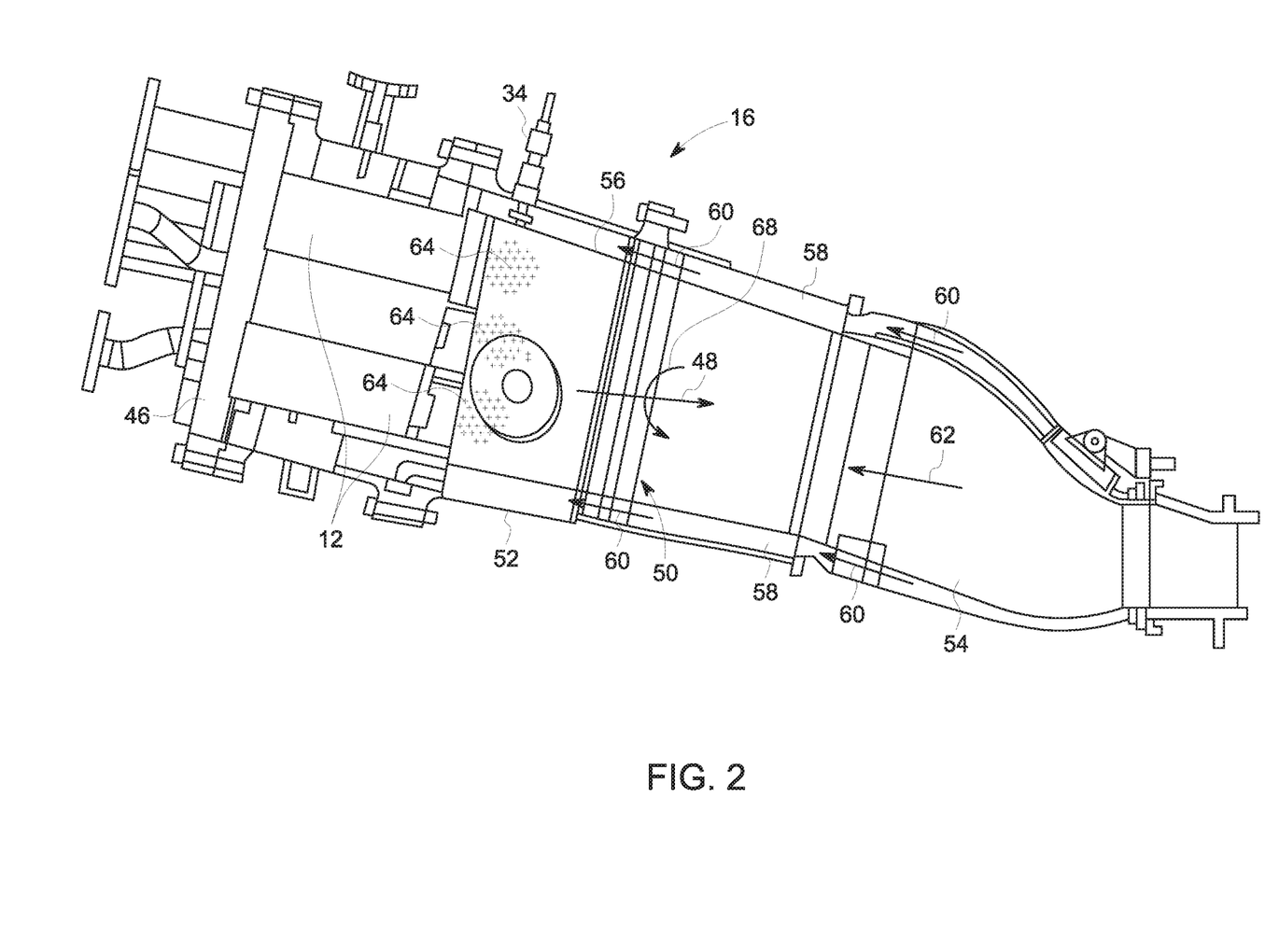
FIG. 2 is a cross-sectional view of an embodiment of the combustor that may be used within the gas turbine system of FIG. 1, including an embodiment of the igniter assembly.

FIG. 2 is a cross-sectional view of an embodiment of the combustor 16 that may be used within the gas turbine system of FIG. 1, including an embodiment of the igniter assembly 34. As illustrated, the combustor 16 includes fuel injectors 12 that are attached to an end cover 46 at a base of the combustor 16. In certain embodiments, the combustor 16 may include 5, 10, 15, 20, or more than 20 fuel injectors 12. In other embodiments, the combustor 16 may include a single large fuel injector 12. The surfaces and geometry of the fuel injectors 12 are configured to enhance mixing of the air and fuel as the fuel-air mixture flows downstream through the combustor 16. The mixing may increase combustor efficiency, thereby producing more power in the turbine 18. The fuel-air mixture is expelled from the fuel injectors 12 in a downstream direction 48 to a combustion zone 50 inside a combustor casing 52.

In the illustrated embodiment, the combustion zone 50 is located inside the combustor casing 52, downstream from the fuel injectors 12 and upstream from a transition piece 54, which directs the pressurized exhaust gas toward the turbine 18. The transition piece 54 includes a converging section configured to increase a velocity of the exhaust gas, thereby producing a greater force to drive the turbine rotor in rotation. In the illustrated embodiment, the combustor 16 includes a liner 56 located inside the casing 52 to provide a hollow annular path 58 for a cooling airflow 60, which cools the casing 52 around the combustion zone 50. As illustrated, the cooling airflow 60 flows in an upstream direction 62, opposite the downstream direction 48, through the hollow annular path 58 to the fuel injectors 12. The airflow 60 then mixes with the fuel to establish a fuel-air mixture suitable for combustion. In certain embodiments, the liner 56 includes cooling holes configured to facilitate passage of the cooling airflow into an interior of the combustor, thereby cooling the liner 56 and/or providing additional air for combustion. Furthermore, the liner 56 may establish a suitable shape to improve flow from the fuel injectors 12 to the turbine 18.

In the illustrated embodiment, the combustor 16 includes the igniter assembly 34 configured to initiate combustion of the fuel-air mixture. The igniter assembly 34 extends through the casing 52, and an opening in the liner 56 enables plumes of ionized gas from the igniter assembly 34 to extend into the combustion zone 50, and thus, facilitate ignition of the fuel-air mixture. Accordingly, the igniter assembly 34 may be used to establish flames 64 within the combustor 16. Typically, the igniter assembly 34 is supplied with a conventional electrical waveform that includes a waveform profile having a relatively large pulse, which defines a burst of the conventional electrical waveform that repeats during each period of the conventional electrical waveform. Accordingly, the conventional electrical waveform may supply a relatively large amount of electrical energy to the igniter assembly 34 during each burst, which generates large plumes of ionized gas that extend into the combustion zone 50. The conventional electrical waveform is supplied to the igniter assembly 34 throughout operation of the igniter assembly 34, such that each burst (e.g., each electrical pulse) of the conventional electrical waveform enables the igniter assembly 34 to generate a respective plasma plume, which may induce ignition of the fuel-air mixture. Throughout the following discussion, each burst supplied by the conventional electrical waveform to the igniter assembly 34 will be referred to herein as an "ignition event" or, in other words, an attempt of the igniter assembly 34 to induce ignition of the fuel-air mixture using the conventional electrical waveform.

Multitudinous pulses of electrical energy are ordinarily supplied to the igniter assembly 34 before successful ignition of the fuel-air mixture is achieved, which may induce wear on the igniter assembly 34 and/or electrodes of the igniter assembly 34. As discussed in detail below, embodiments of the present disclosure are directed toward an augmented electrical waveform (e.g., a multi-pulse waveform) that increases a likelihood of igniting the fuel-air mixture during operation of the igniter assembly 34, without increasing the energy per burst, thereby reducing an overall quantity of pulses supplied to the igniter assembly 34 before ignition of the fuel-air mixture is achieved. In other words, the augmented electrical waveform may reduce a quantity of sparks generated by the igniter assembly 34 to achieve successful light-off (e.g., ignition) of the fuel-air mixture. For clarity, it should be noted that throughout the following discussion, the term "light-off" refers to the development of a stable flame (e.g., a continuous flame) within the combustor 16. In other words, an ignition event of the igniter assembly 34 may generate light-off of the fuel-air mixture if a stable flame is generated and maintained within the combustor 16 after the ignition event has occurred. In certain embodiments, the igniter assembly 34 may receive bursts of the same energy as the conventional electrical waveform, but successfully ignite the fuel-air mixture within the combustor 16 in a fewer number of bursts as the conventional waveform, thereby reducing an overall energy supplied to the igniter assembly 34 before light-off is achieved. In some embodiments, the igniter assembly 34 may receive bursts of a lesser energy as the conventional electrical waveform, while still achieving successful ignition of the fuel-air mixture via fewer bursts than when the igniter assembly 34 is supplied with the conventional electrical waveform. As a result, the augmented electrical waveform may reduce wear on the electrodes of the igniter assembly 34, thereby reducing the frequency of maintenance operations on the gas turbine system 10 (e.g., replacing the igniter assembly 34). While the illustrated combustor 16 includes one igniter assembly 34, it should be appreciated that in alternative embodiments, the combustor 16 may include additional igniter assemblies, such as 1, 2, 3, or more than 3 igniter assemblies.

Figure 3:
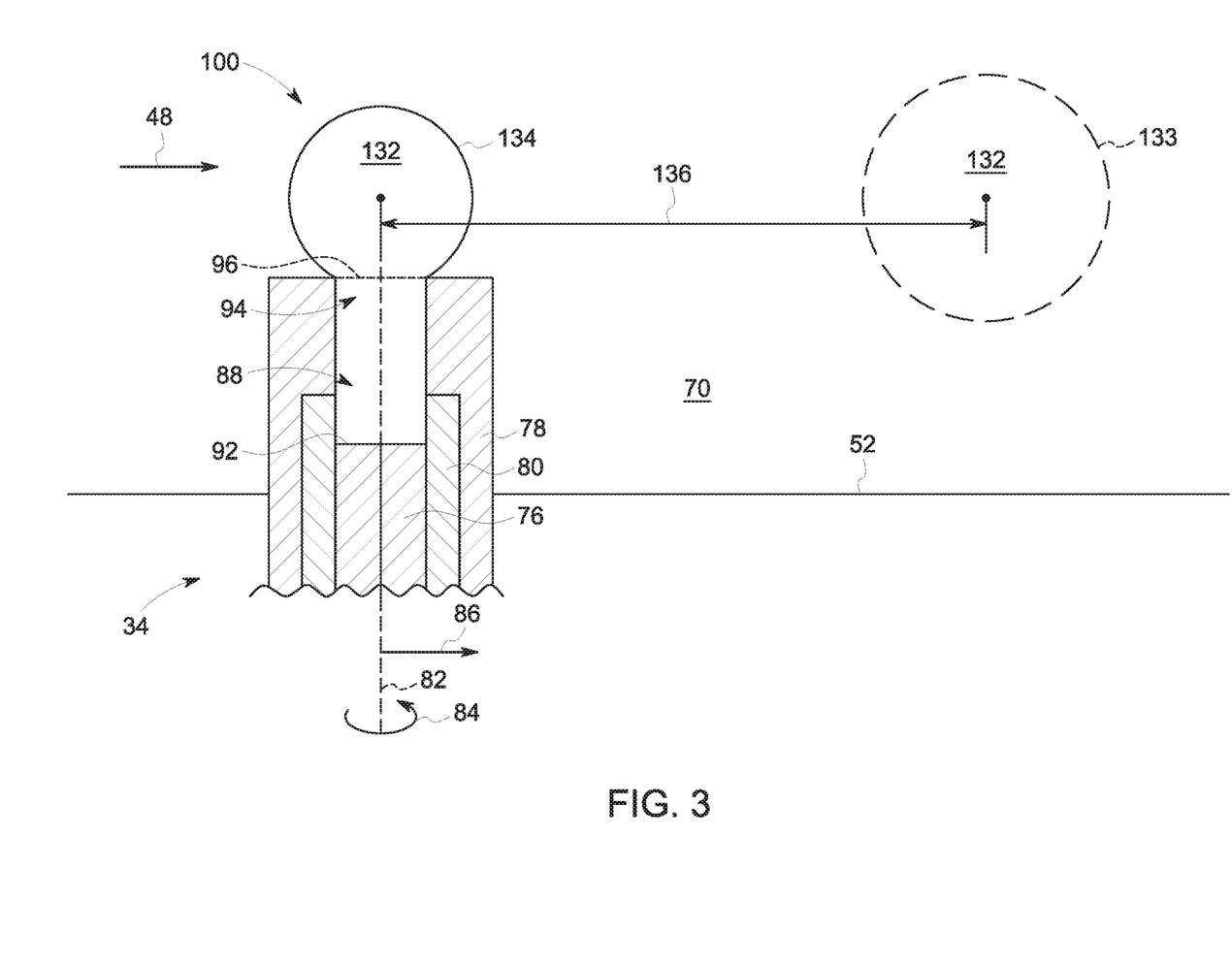
FIG. 3 is a cross-sectional view of an embodiment of the igniter assembly that may be used in the combustor of FIG. 2.

With the foregoing in mind, FIG. 3 is a cross-sectional view of an embodiment of the igniter assembly 34 that may be used in the combustor 16 of FIG. 2. In the illustrated embodiment, the igniter assembly 34 extends into a flow path 70 defined by the combustor casing 52 of the combustor 16. Accordingly, the flow path 70 may include a portion of the combustion zone 50 or all of the combustion zone 50. The igniter assembly 34 includes a first electrode, such as the illustrated center electrode 76, a second electrode, such as the illustrated outer shell electrode 78, and an insulator 80. As illustrated, the outer shell electrode 78 is disposed about the center electrode 76, and the insulator 80 is disposed radially between the center electrode 76 and the outer shell electrode 78. In certain embodiments, the igniter assembly 34 is circularly symmetric about a central axis 82. In such embodiments, the igniter assembly 34 may have a circular cross-section within a plane extending perpendicularly to the central axis 82. In addition, the insulator 80 and the outer shell electrode 78 extend about the center electrode 76 along a circumferential axis 84, and the insulator 80 is disposed between the center electrode 76 and the outer shell electrode 78 along a radial axis 86. While the first electrode includes a single center electrode in the illustrated embodiment, it should be appreciated that in alternative embodiments the first electrode may be positioned off-center relative to the central axis and/or may include multiple separate electrodes. In addition, while the second electrode is a single outer shell electrode in the illustrated embodiment, it should be appreciated that in alternative embodiments, the second electrode may not extend about the first electrode and/or may include multiple separate electrodes.

The center electrode 76, the outer shell electrode 78, and the insulator 80 form a cavity 88. As illustrated, the cavity 88 extends from an upper end portion 92 of the center electrode 76 to an outlet passage 94 (e.g., at interface 96) of the igniter assembly 34. While the igniter assembly 34 includes a single fluid passage (e.g., the outlet passage 94) extending to/from the cavity 88 in the illustrated embodiment, it should be appreciated that in alternative embodiments, multiple fluid passages may extend to/from the cavity 88. For example, in certain embodiments, the igniter assembly 34 may have a separate inlet configured to receive gas for ionization.

As previously discussed, in certain embodiments, the igniter assembly 34 has a substantially circular cross-sectional shape (e.g., shape of the cross-section within a plane extending perpendicularly to the central axis 82). Accordingly, each of the center electrode 76, the outer shell electrode 78, and the insulator 80 may have a substantially circular cross-sectional shape. In addition, in certain embodiments, each of the cavity 88 and the outlet passage 94 may have a substantially circular cross-sectional shape. However, it should be appreciated that in alternative embodiments, the cavity 88 and/or the outlet passage 94 may have another suitable cross-sectional shape, such as elliptical or polygonal, among other suitable shapes. Furthermore, in certain embodiments, the center electrode 76, the outer shell electrode 78, the insulator 80, or a combination thereof may have other suitable cross-sectional shapes. For example, at least one of the center electrode 76, the insulator 80, and the outer shell electrode 78 may have an elliptical or polygonal cross-sectional shape, or another suitable cross-sectional shape. Furthermore, the radially inward surface of the insulator 80 and/or the outer shell electrode 78 may have a cross-sectional shape corresponding to the cross-sectional shape of the cavity 88, and/or the radially inward surface of the outer shell electrode 78 may have a cross-sectional shape correspond to the cross-sectional shape of the outlet passage 94. As used herein, "cross-sectional area" refers to the area of the cross-section of the cavity 88 or the outlet passage 94 within a plane extending perpendicularly to the central axis 82, regardless of the cross-sectional shape of the cavity 88 or the outlet passage 94.

In the illustrated embodiment, the outlet passage 94 is the only fluid passage extending from the cavity 88. Accordingly, gas and, in certain embodiments, liquid droplets within the flow path 70 (e.g., fuel, air, combustion products, exhaust gas, etc.) may enter the cavity 88 via the outlet passage 94. In response to applying an electrical current (e.g., an electrical waveform) to the center electrode 76 or to the outer shell electrode 78, a spark may be generated between the center and outer shell electrodes 76, 78. As such, the gas within the cavity 88 may be ionized and, in certain embodiments, the liquid droplets within the cavity 88 may be vaporized and ionized. The ionization of the gas within the cavity 88 may induce the ionized gas to expand. Expansion of the gas within the cavity 88 increases the fluid pressure within the cavity 88, and the fluid pressure drives the ionized gas through the outlet passage 94 thus generating a plume 100 of ionized gas that extends into the flow path 70.

Figure 4:
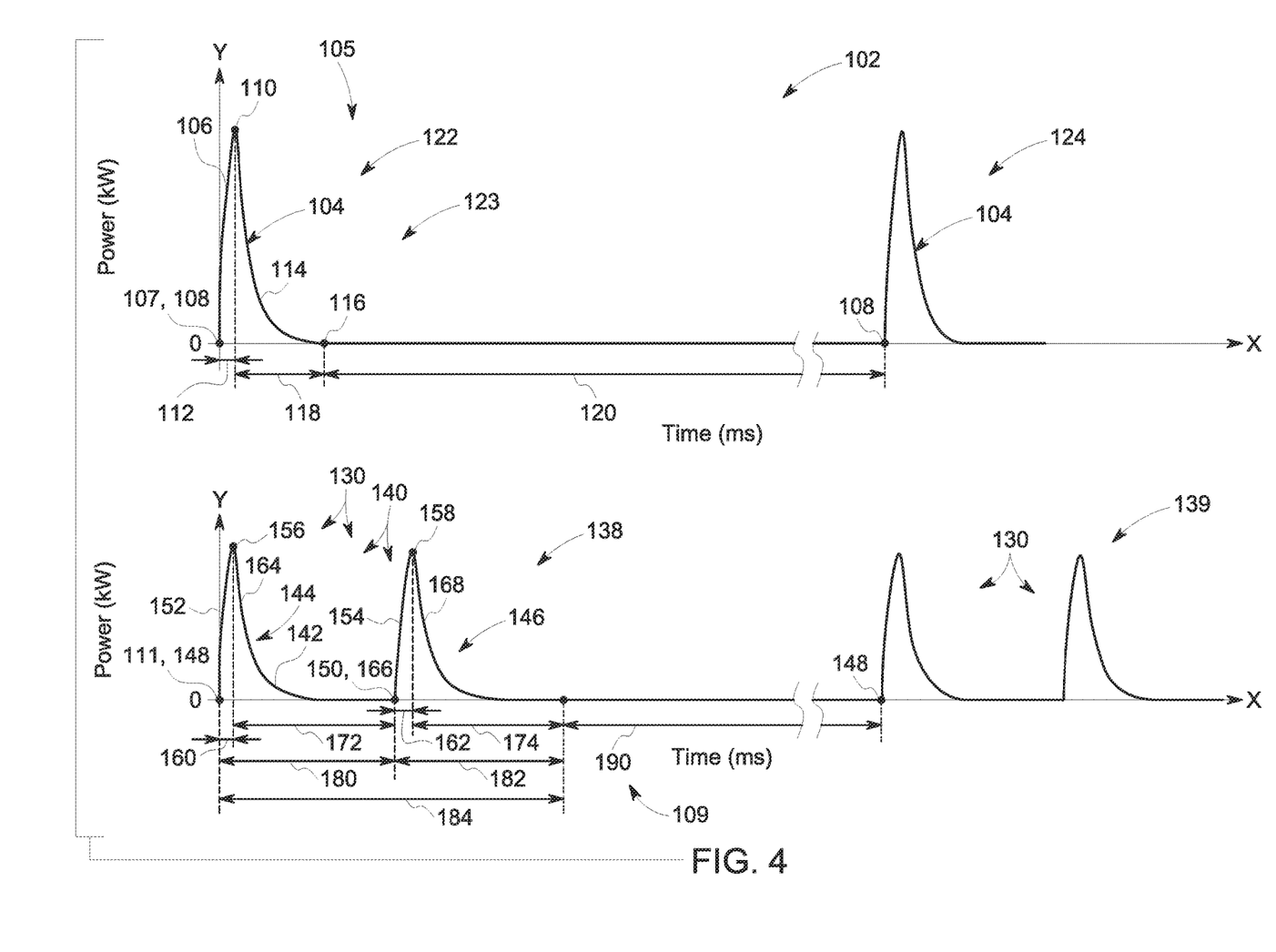
FIG. 4 is an embodiment of a chart showing a conventional electrical waveform and an augmented electrical waveform that may be supplied to the igniter assembly of FIG. 3.

As noted above, the electrical current is supplied to the electrodes (e.g., the center or outer shell electrodes 76, 78) of the igniter assembly 34 in the form of a cyclically repeating electrical waveform. For example, FIG. 4 illustrates an embodiment of a chart 102 showing a conventional electrical waveform 104 that may be supplied to the center electrode 76 during operation of the igniter assembly 34. For clarity, the conventional electrical waveform 104 is illustrated in an upper portion 105 of the chart 102, which includes a first origin 107 defining an initiating point of the 'x' axis and the 'y' axis of the upper portion 105 of the chart 102. The chart 102 additionally depicts an augmented electrical waveform in a lower portion 109 of the chart 102, which will be discussed in greater detail below. Similar to the upper portion 105 of the chart 102, the lower portion 109 of the chart 102 includes a respective origin 111 that defines an initiating point of the 'x' axis and the 'y' axis of the lower portion 109 of the chart 102. It should be noted that a scaling factor of both the 'x' axis and the 'y' axis of the upper and lower portions 105, 109 of the chart 102 are the same. In the illustrated embodiment of FIG. 4, the conventional electrical waveform 104 is indicative of an amount of electrical power (e.g., in kilo-watts) supplied to the center electrode 76 over a predetermined time interval. However, it should be noted that the conventional electrical waveform 104 may also be indicative of a magnitude of electrical current supplied to the center electrode 76 over the predetermined time interval.

For clarity, it should be noted that the illustrated embodiment of the conventional electrical waveform 104 shows a first burst 123 of the conventional electrical waveform 123 and a second burst 124 of the conventional electrical waveform 104. Throughout the following discussion, the features of the conventional electrical waveform 104 will be described with reference to the first burst 123 of the conventional electrical waveform 104. However, it should be noted that the described features of the first burst 123 may be included in the second burst 124 of the conventional electrical waveform 104, and any subsequently occurring burst that is supplied by the conventional electrical waveform 104 to the igniter assembly 34. With the foregoing in mind, the conventional electrical waveform 104 includes a rising section 106 that extends between an initiating point 108 and an apex 110 of the conventional electrical waveform 104. The initiating point 108 defines a commencement time of the conventional electrical waveform 104, which may be indicative of a time at which a burst (e.g., the first burst 123)

of the conventional electrical waveform 104 initiates. In some embodiments, an electrical power output of the conventional electrical waveform 104 is substantially zero at the initiating point 108. The apex 110 is indicative of a maximum electrical power output (e.g., a peak electrical current output) of the conventional electrical waveform 104 during a burst of the conventional electrical waveform 104. Accordingly, the rising section 106 defines a rate at which an electrical power output of the conventional electrical waveform 104 may transition from substantially zero at the initiating point 108 to the maximum electrical power output at the apex 110, as well as an elapsed time period (e.g., a rise time 112) therebetween. The conventional electrical waveform 104 includes a decaying section 114 that extends between the apex 110 and a terminating point 116, which defines a conclusion of the burst (e.g., a conclusion the first burst 123) of the conventional electrical waveform 104. In some embodiments, the electrical power output of the conventional electrical waveform 104 may return to substantially zero at the terminating point 116. Similar to the rising section 106 discussed above, the decaying section 114 defines a rate at which the electrical power output of the conventional electrical waveform 104 transitions from the maximum electrical power output at the apex 110 to a substantially negligible electrical power output at the terminating point 116, as well as an elapsed time period (e.g., a decay time 118) therebetween. It should be noted that the initiating point 108, the rising section 106, the apex 110, the decaying section 114, the terminating point 116, or any combination thereof, may be determined by the waveform generation module 36. In some embodiments, the waveform generation module 36 may adjust the initiating point 108, the rising section 106, the apex 110, the decaying section 114, and/or the terminating point 116 based on certain operational properties of the igniter assembly 34 and/or a geometric configuration of the igniter assembly 34.

As noted above and described in greater detail herein, each burst supplied by the conventional electrical waveform 104 to the igniter assembly 34 defines an ignition event of the igniter assembly 34 or, in other words, an attempt of the igniter assembly 34 to ignite the fuel-air mixture by exhausting a plume of ionized gas into the flow path 70. Each burst of the conventional electrical waveform 104 is separated by an intermissive period 120, which separates sequential bursts of the conventional electrical waveform 104. For example, as shown in the illustrated embodiment of FIG. 4, the intermissive period 120 extends between the terminating point 116 of the first burst 123 and the initiating point 108 of the second burst 124, which may occur subsequent to the first burst 123. Accordingly, the rise time 112, the decay time 118, and the intermissive period 120 collectively define a period of the conventional waveform 104. The conventional electrical waveform 104 includes a single pulse 122 (e.g., an electrical pulse) occurring during each burst of the conventional electrical waveform 104, which is formed by the rising section 106 and the decaying section 114. Accordingly, the pulse 122 is indicative of a total electrical power output generated during an entire burst of the conventional electrical waveform 104 (e.g., an amount of electrical power output between the initiating and terminating points 108, 116).

Returning now to FIG. 3, which illustrates conventional plumes 132 of ionized gas that are generated when supplying the conventional electrical waveform 104 to the igniter assembly 34. Because each burst of the conventional electrical waveform 104 includes a single pulse (e.g., the pulse 122), each burst supplied by conventional electrical waveform 104 to the igniter assembly 34 generates one spark, and thus, a single plume (e.g., the conventional plume 130) of ionized gas, which is expelled from the outlet passage 94 of the igniter assembly 34. As such, subsequent bursts supplied by the conventional electrical waveform 104 to the igniter assembly 34 to generate intermittently spaced conventional plumes 132. For example, the first burst 123 supplied by the conventional electrical waveform 104 generates a first plume 133 of ionized gas, while a second, subsequent burst (e.g., the second burst 124) supplied by the conventional electrical waveform 104 generates a second plume 134 of ionized gas. Gas flow along the flow path 70 (e.g., in the downstream direction 48) may generate a separation distance 136 between the first and second plumes 133, 134, which may be proportional to a magnitude of the intermissive period 120. For example, increasing a magnitude of the intermissive period 120 may increase a magnitude of the separation distance 136, while decreasing a magnitude of the intermissive period 120 decreases a magnitude of the separation distance 136. In any case, the first plume 133 is disposed downstream of the igniter assembly 34 when the second plume 134 is generated within the cavity 88 and egresses from the outlet passage 94. Similarly, each subsequently generated plume of ionized gas will be disposed upstream of the previously generated plume of ionized gas.

As noted above, the fuel injectors 12 direct a fuel-air mixture through the combustor casing 52 in the downstream direction 48, such that the fuel-air mixture flows across the igniter assembly 34 disposed within the flow path 70. In some embodiments, the fuel injectors 12 and the combustor casing 52 cooperate to form recirculation zones within the combustor 16, which direct the fuel-air mixture across the igniter assembly 34. The large, intermittently spaced conventional plumes 132 generated by suppling the conventional electrical waveform 104 to the igniter assembly 34 may be ineffective to ignite the fuel-air mixture flowing along the flow path 70, especially during atypical operating conditions of the combustor 16 (e.g., lean burn, high temperatures). Accordingly, in some embodiments, the energy supplied in a single burst of the conventional electrical waveform 104 is increased to improve the probability of light-off. In other embodiments the igniter assembly 34 may receive 10, 15, 20, 25, or more bursts via the conventional electrical waveform 104, each supplying the pulse 122 of electrical energy, before successful ignition of the fuel-air mixture is achieved. Unfortunately, increased pulse energy, or delivering multitudinous pulses of electrical energy to the igniter assembly 34 decreases an operational life of the center electrode 76 and the outer shell electrode 78 due to the sparks generated therebetween during each delivered pulse, which may induce wear on the center and outer shell electrodes 76, 78. The conventional electrical waveform 104 may additionally induce wear on the inner and outer shell electrodes 76, 78 because of the relatively large amount of electrical energy supplied to the inner and outer shell electrodes 76, 78 during each individual pulse of the conventional electrical waveform 104.

Accordingly, embodiments of the present disclosure are directed to an augmented electrical waveform 130, as shown in the illustrated embodiment of the lower portion 109 of the chart 102 in FIG. 4, which may be supplied to the igniter assembly 34 (e.g., via the waveform generation module 36) in lieu of the conventional electrical waveform 104. In the illustrated embodiment of FIG. 4, the augmented electrical waveform 130 is indicative of an amount of electrical power (e.g., in kilo-watts) supplied to the center electrode 76 over a predetermined time interval. However, the augmented electrical waveform 130 may also be indicative of a magnitude of electrical current supplied to the center electrode 76 over the predetermined time interval. Similar to the first and second bursts 123, 124 of the conventional electrical waveform 104 discussed above, it should be noted that the illustrated embodiment of the augmented electrical waveform 130 shows a first burst 138 of the augmented electrical waveform 130 and a second burst 139 of the augmented electrical waveform 130. Throughout the following discussion, the features of the augmented electrical waveform 130 will be described with reference to the first burst 138 of the augmented electrical waveform 130. However, it should be noted that the described features of the first burst 138 may be included in the second burst 139 of the augmented electrical waveform 130 of the augmented electrical waveform 130, and any subsequently occurring burst that is supplied by the augmented electrical waveform 130 to the igniter assembly 34. In contrast to the conventional electrical waveform 104, each burst of the augmented electrical waveform 130 includes a multi-pulse waveform profile. As described in greater detail herein, this waveform architecture may reduce a total quantity of pulses supplied to the igniter assembly 34 before ignition of the fuel-air mixture within the flow path 70 is achieved (e.g., as compared to a total quantity of pulses supplied to the igniter assembly 34 before ignition is achieved via the conventional electrical waveform 104 including a same value of energy per burst). For example, although the augmented electrical waveform 130 includes multiple pulses within every burst of the augmented electrical waveform 130, when supplied to the igniter assembly 34, the augmented electrical waveform 130 enables the igniter assembly 34 to ignite the fuel-air mixture with significantly fewer supplied bursts than the conventional electrical waveform 104. In some embodiments, the augmented electrical waveform 130 enables the igniter assembly 34 to ignite the fuel-air mixture with significantly fewer supplied bursts than the conventional electrical waveform 104, while each burst of the augmented electrical waveform 130 supplies an electrical energy input to the igniter assembly 34 that is equal to an electrical energy input supplied to the igniter assembly 34 by a burst of the conventional electrical waveform 104. Accordingly, the augmented electrical waveform 130 may reduce a total quantity of sparks generated between the center electrode 76 and the outer shell electrode 78 before ignition of the fuel air mixture is achieved, as compared to the conventional electrical waveform 104.

As shown in the illustrated embodiment of FIG. 4, the augmented electrical waveform 130 includes a waveform profile 142 having a pair of electrical pulses 140, which collectively define a burst of the augmented electrical waveform 130. Specifically, the pair of electrical pulses 140 include a first pulse 144 (e.g., a leading pulse) and a second pulse 146 (e.g., a trailing pulse). The first pulse 144 and the second pulse 146 include a first initiating point 148 and a second initiating point 150, respectively, which define a commencement time (e.g., an onset time) of the first pulse 144 and the second pulse 146. Accordingly, the first initiating point 148 is indicative of a time at which a burst (e.g., the first burst 138) of the augmented electrical waveform 130 initiates. In some embodiments, an electrical power output of the augmented electrical waveform 130 at the first and second initiating points 148, 150 may be substantially zero. However, in other embodiments, an electrical power output at the first and second initiating points 148, 150 may correspond to a previously determined, non-zero electrical power output.

A first rising section 152 and a second rising section 154 extend between the first and second initiating points 148, 150 and a first apex 156 and a second apex 158, respectively. Accordingly, the first and second rising sections 152, 154 define a rate at which an electrical power output of the augmented electrical waveform 130 transitions from substantially zero (or from the predetermined non-zero value) at the first and second initiating points 148, 150 to a maximum electrical power output at the first and second apexes, 156, 158, respectively. As such, the first and second rising sections 152, 154 are also indicative of an elapsed time period between the first initiating point 148 and the first apex 156 (e.g. a first rise time 160) and an elapsed time between the second initiating point 150 and the second apex 158 (e.g., a second rise time 162), respectively.

The first and second apexes 156, 158 may respectively define the maximum electrical power output (e.g., a peak electrical current output) of the first pulse 144 and the second pulse 146 during a burst of the augmented electrical waveform 130. For example, in some embodiments, an electrical current output at each of the first and second apexes 156, 158 may be between about 0.1 kilo-Amperes (kA) and about 3 kA, between about 0.7 kA and about 2 kA, between about 0.75 kA and about 1.2 kA, between about 0.8 kA and about 1.0 kA, or about 0.95 kA. While a magnitude of the first apex 156 and the second apex 158 are shown as equal in the illustrated embodiment of FIG. 4, it should be noted that in other embodiments, a maximum electrical power output for the first apex 156 may be different than a maximum electrical power output of the second apex 158. For example, an electrical power output at the first apex 156 may be greater than, or less than an electrical power output at the second apex 158. As another example, in some embodiments, the maximum electrical power output of the first apex 156 may be one third of the maximum electrical power output of the second apex 156, or three times the maximum electrical power output of the second apex 156.

The first pulse 144 includes a first decaying section 164 that extends between the first apex 156 and a first terminating point 166 of the first pulse 144. It should be noted that in certain embodiments, the first terminating point 166 may be the same as the second initiating point 150 of the second pulse 146. However, in other embodiments, an intermissive period (e.g., a time delay) may be disposed between the first terminating point 166 and the second initiating point 150, such that the first pulse 144 is spaced apart from the second pulse 146. In some embodiments, a time delay (e.g., a pulse spacing) between the first pulse 144 and the second pulse 146 (e.g., between the first apex 156 and the second apex 158, between the first initiating point 148 and the second initiating point 150, etc.) may be between about 0.05 milliseconds and about 10 milliseconds, between about 0.1 milliseconds and about 3 milliseconds, between about 0.3 milliseconds and about 2 milliseconds, between about 0.5 milliseconds and about 1 millisecond, or greater than 10 milliseconds. In any case, the second pulse 146 includes a second decaying section 168 that extends between the second apex 158 and a second terminating point 170 of the second pulse 146. As such, the second terminating point 170 may also define a terminating point of a burst (e.g., the first burst 138) of the augmented electrical waveform 130.

Similar to the first rising section 152 discussed above, the first decaying section 164 defines a rate at which an electrical power output of the first pulse 144 may decrease from the maximum electrical power output at the first apex 156 to a substantially negligible power output at the first terminating point 166, as well as a time period therebetween (e.g., a first decay time 172). The second decaying section 168 defines a rate at which an electrical power output of the second pulse 146 may decrease from the respective maximum electrical power output at the second apex 158 to a substantially negligible electrical power output at the second terminating point 170, as well as a time period therebetween (e.g., a second decay time 174).

The pair of electrical pulses 140 are shown as unipolar positive in the illustrative embodiment of the augmented electrical waveform 130 shown in FIG. 4. In other words, both the first pulse 144 and the second pulse 146 have a positive electrical polarity. However, it should be noted that in other embodiments, the pair of electrical pulses 140 may be unipolar negative, such that the first and second pulses 144, 146 each have a negative electrical polarity. In yet further embodiments, the pair of electrical pulses 140 may have a mixed polarity, in which the first pulse 144 has a positive electrical polarity while the second pulse 146 has a negative electrical polarity, or vice versa.

In any case, the first rise time 160 and the first decay time 172 collectively define a first pulse duration 180 of the first pulse 144. Accordingly, the first pulse duration 180 is indicative of a time period during which the first pulse 144 has a non-zero value or, in other words, a time period during which the first pulse 144 may adequately supply electrical power to the igniter assembly 34. Similarly, the second rise time 162 and the second decay time 174 collectively define a second pulse duration 182 of the second pulse 146. In some embodiments, the first and second pulse durations 180, 182 may each be between about 3 micro seconds (μs) and about 300 micro seconds, between about 50 micro seconds and about 200 μs, between about 70 μs and about 180 μs, between about 80 μs and about 120 μs, or about 86 μs. In other embodiments, the first pulse duration 180 and the second pulse duration 182 may each be between about 100 μs and about 250 μs, between about 250 μs and about 300 μs, between about 300 μs and about 500 μs, or more than 500 μs. While the first and second pulse durations 180, 182 are shown as equal in the illustrated embodiment of the augmented electrical waveform 130, it should be noted that in other embodiments, a magnitude of the first and second pulse durations 180, 182 may be different from one another. For example, in some embodiments, the first pulse duration 180 may greater than, or less than the second pulse duration 182. As described in greater detail herein, the first and second pulse durations 180, 182 thus collectively define a discharging time period 184 throughout which the augmented electrical waveform 130 supplies a burst of electrical energy to the igniter assembly 34.

It should be noted that the first rise time 160 and the first decay time 172 may each include any suitable portions of the first pulse duration 180, such that the first rise time 160 and the first decay time 172 collectively sum to the first pulse duration 180. Similarly, the second rise time 162 and the second decay time 174 may include any suitable portions of the second pulse duration 182 that collectively sum to the second pulse duration 182. Further, while the waveform profile 142 of the augmented electrical waveform 130 is shown as a generally saw-toothed profile in the illustrated embodiment of FIG. 4, the first and second rise times 160, 162 and the first and second decay times 172, 174 may be adjusted to generate any suitable waveform profile. For example, the waveform profile 142 may include, but is not limited to, a sinusoidal wave, a square wave, a triangular wave, or any other suitable waveform. In certain embodiments, a waveform profile corresponding to the first pulse 144 may be different than a waveform profile corresponding the second pulse 146. For example, the first pulse 144 may include a generally saw-toothed wave profile while the second pulse 146 includes a generally square wave profile.

In any case, the first and second pulses 144, 146 each discharge a predetermined amount of electrical energy to the igniter assembly 34 which, as described in greater detail herein, enables the igniter assembly 34 to generate a pair of respective plasma plumes that extend into the flow path 70. In some embodiments, the first pulse 144 and the second pulse 146 may each supply about 1.5 Joules of electrical energy to the igniter assembly 34 during a burst of the augmented electrical waveform 130. Accordingly, a total amount of electrical energy supplied to the igniter assembly 34 during one burst of the augmented electrical waveform 130 may be about 3.0 Joules (e.g., an amount of electrical energy of both the first and second pulses 144, 146). However, in other embodiments, the first and second pulses 144, 146 may each supply an amount of electrical energy to the igniter assembly 34 that is between about 0.1 Joules and about 10 Joules, between about 0.25 Joules and about 3.5 Joules, between about 0.5 Joules and about 3 Joules, between about 1 Joule and about 2 Joules, or more than 2 Joules. In certain embodiments, an amount of electrical energy supplied to the igniter assembly 34 via the first pulse 144 may be greater than, or less than amount of electrical energy supplied to the igniter assembly 34 via the second pulse 146. As a non-limiting example, the first pulse 144 may supply about 2.0 Joules of electrical energy to the igniter assembly 34, while the second pulse supplies about 1.0 Joule of electrical energy to the igniter assembly 34.

As noted above, the augmented electrical waveform 130 may supply sequential bursts of electrical energy to the igniter assembly 34, each of which are separated by an intermissive period 190. For clarity, the intermissive period 190 is defined as a period of elapsed time between the second terminating point 170 of a previous burst (e.g., the first burst 138) of the augmented electrical waveform 130 and the first initiating point 148 of a second, subsequent burst (e.g., the second burst 139) of the augmented electrical waveform 130. Accordingly, the discharging time period 184 and the intermissive period 190 collectively define a period of the augmented electrical waveform 130. In some embodiments, the intermissive period 190 may be between about 0.1 seconds and about 5 seconds, between about 0.25 seconds and about 1 second, between about 1 second and about 4 seconds, or between about 2 seconds and about 3 seconds. However, in other embodiments, the intermissive period 190 may be less than 0.5 seconds or greater than 5 seconds. Accordingly, when supplied to the igniter assembly 34, the augmented electrical waveform 130 may enables the igniter assembly 34 to generate intermittent clusters of plasma plumes, in which each cluster of plasma plumes incudes a respective plume generated by the first pulse 144 and a respective plume generated by the second pulse 146. Therefore, each burst of electrical energy supplied by the augmented electrical waveform to the igniter assembly 34 defines an ignition event of the igniter assembly 34. In other words, when supplied with the augmented electrical waveform 130, the ignition event of the igniter assembly 34 generates a pair of contiguous plasma plumes that exhaust from the cavity 88 and into the flow path 70 of the combustor 16, as discussed in greater detail below.

While the discussed embodiments of the augmented electrical waveform 130 have been described as having a pair of electrical pulses (e.g., the first pulse 144 and the second pulse 146), it should be noted that the augmented electrical waveform 130 may include any suitable quantity of electric pulses. For example, the augmented electrical waveform 130 may include 2, 3, 4, 5, or 6 electrical pulses, such that when supplied to the igniter assembly 34, each burst of the augmented electrical waveform 130 generates 2, 3, 4, 5, or 6 sparks, and thus, generates 2, 3, 4, 5, or 6 plasma plumes, respectively.

Figure 5:
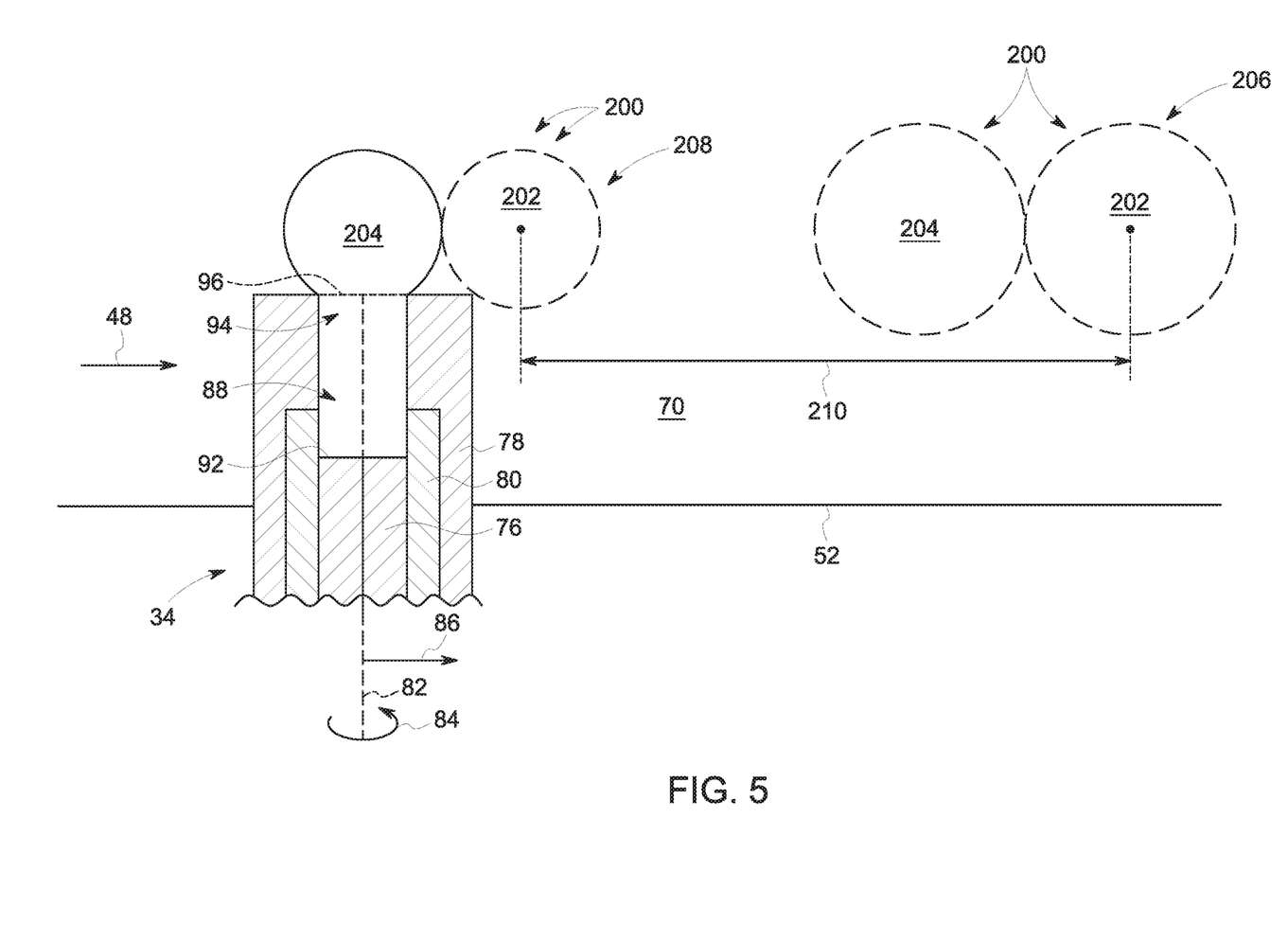
FIG. 5 is a cross-sectional view of an embodiment of the igniter assembly of FIG. 3 having the augmented electrical waveform supplied thereto.

With the foregoing in mind, FIG. 5 illustrates an embodiment of a pair of plasma plumes 200 that may be generated by the igniter assembly 34 when the augmented electrical waveform 130 is supplied thereto. Because each burst supplied by the augmented electrical waveform 130 includes a pair of electrical pulses (e.g., the first pulse 144 and the second pulse 146), each supplied burst of the augmented electrical waveform 130 generates a pair of sparks (e.g., between the center and outer shell electrodes 76, 78), and thus, the pair of plasma plumes 200, which are consecutively expelled from the outlet passage 94 the igniter assembly 34. For example, the first pulse 144 of the augmented electrical waveform 130 may generate a first plasma plume 202 that is expelled from the outlet passage 94, while the second pulse 146 subsequently generates a second plasma plume 204 to be expelled from the outlet passage 94 thereafter. As such, sequential bursts supplied by the augmented electrical waveform 130 to the igniter assembly 34 may generate intermittently spaced clusters of plasma plumes during each ignition event, where each cluster includes a first plasma plume (e.g., the first plasma plume 202) and a second plasma plume (e.g., the second plasma plume 204).

For example, the first burst 138 of the augmented electrical waveform 130 may generate a first cluster of plasma plumes 206, while a second, subsequent burst of the augmented electrical waveform 130 (e.g., the second burst 139) may generate a second cluster of plasma plumes 208. Gas flow along the flow path 70 may direct the pair of plasma plumes 200 in the downstream direction 48. Accordingly, the gas flow may generate a separation distance 210 between the first cluster of plasma plumes 206, the second cluster of plasma plumes 208, and any additional cluster of plasma plumes generated thereafter. The magnitude of the separation distance 210 may be proportional to a magnitude of the intermissive period 190. Accordingly, a relatively long intermissive period 190 may increase the separation distance 210 between the first and second clusters of plasma plumes 206, 208, while a relatively short intermissive period may decrease the separation distance between the first and second clusters of plasma plumes 206, 208.

In some embodiments, the augmented electrical waveform 130 may enable the igniter assembly 34 to generate the first plasma plume 202 substantially adjacent or contiguous to the second plasma plume 204. Such positioning may facilitate interaction between the pair of plasma plumes 200, which may enhance a likelihood of igniting the fuel-air mixture via the pair of plasma plumes 200. For example, the first and second plasma plumes 202, 204 may collectively distribute the energy discharged via the augmented electrical waveform 130 over a relatively large volume of gas, which may facilitate energy distribution from the augmented electrical waveform 130 to the fuel-air mixture. Accordingly, the augmented electrical waveform 130 may reduce a quantity of bursts supplied by augmented electrical waveform 130 to the igniter assembly 34 before ignition of the fuel-air mixture is achieved. In some cases, this arrangement of the first and second plasma plumes 202, 204 may also enhance an ignition capability of the igniter assembly 34 while the fuel-air mixture within the combustor 16 is lean or atypically hot or cold. In some embodiments, the first pulse duration 180 and the second pulse duration 182 may be adjusted such that the second plasma plume 204 overlaps with the first plasma plume 202 when generated by the igniter assembly 34. However, in other embodiments, the first and second pulse durations 180, 182 may be adjusted such that a separation gap is formed between each plasma plume of the pair of plasma plumes 200.

As noted above, in some embodiments of the augmented electrical waveform 130, an amount of electrical energy supplied to the igniter assembly 34 via each pulse (e.g., via the first and second pulses 144, 146) may be different. In such embodiments, a size (e.g., a volume) of the first and second plasma plumes 202, 204 relative to one another may be proportional to an amount of electrical energy supplied to the igniter assembly 34 via the first pulse 144 and the second pulse 146, respectively. For example, in certain embodiments, a magnitude of the first pulse 144 may be larger than a magnitude of the second pulse 146. Accordingly, a volume of the first plasma plume 202 may be larger than a volume the second plasma plume 204. However, in other embodiments, a magnitude of the first and second pulses 144, 146 may be adjusted such that a volume of the first plasma plume 202 is less than a volume of the second plasma plume 204.

Figure 6:
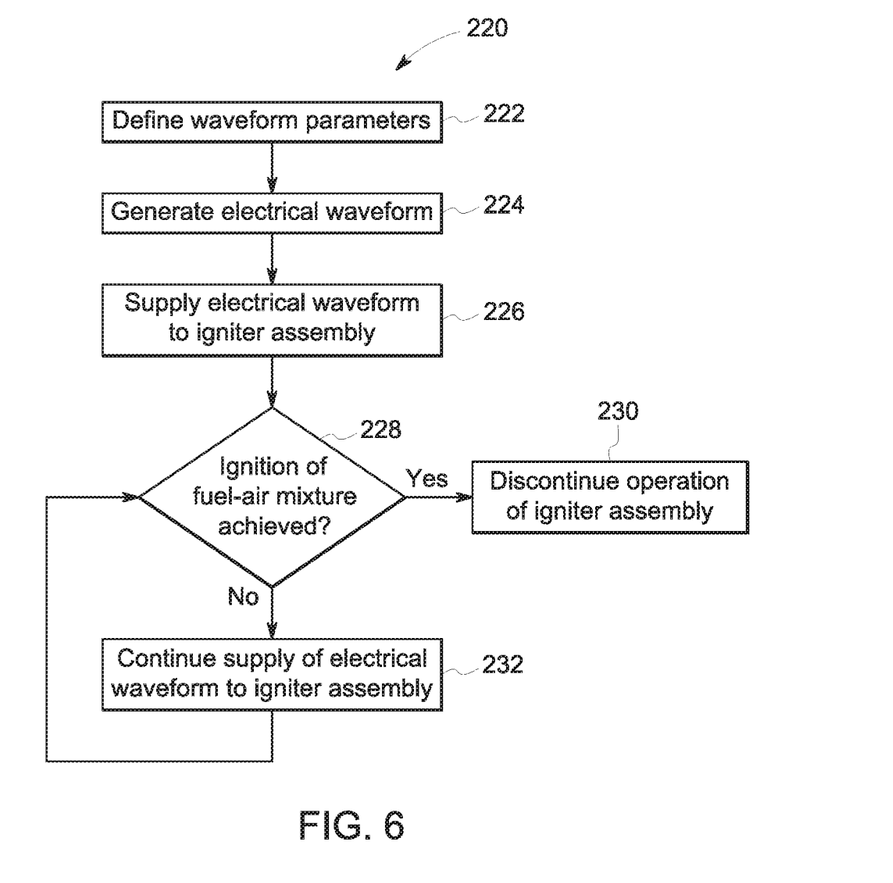
FIG. 6 is an embodiment of a method of operating the igniter assembly of FIG. 3.

FIG. 6 is a block diagram of an embodiment of a method 220 that may be used to operate the igniter assembly 34 using the augmented electrical waveform 130 and facilitate ignition and light-off of the fuel-air mixture within the combustor 16. The following discussion references element numbers used throughout FIGS. 1-5. It should be noted that the method 220 may be performed using the waveform generation module 36 (e.g., via the processor 38 of the waveform generation module 36), via a separate controller included in the gas turbine system 10 and electrically coupled to the igniter assembly 34, or any other suitable controller. The illustrated method 220 includes defining (block 222) waveform parameters of the augmented electrical waveform 130. For example, the waveform profile 142, a magnitude of the generated electric current at the first and second apexes 156, 158, the first and second pulse durations 180, 182, a magnitude of the intermissive period 190, or any other suitable parameters of the augmented electrical waveform 130 may be predetermined and stored (e.g., via the memory device 40) within the waveform generation module 36. However, as noted above, in some embodiments the waveform generation module 36 may adjust certain of the waveform parameters during operation of the gas turbine system 10. In other words, the waveform parameters may be transient, rather than previously determined parameters that remain constant throughout operation of the gas turbine system 10.

The waveform generation module 36 may generate (block 224) the augmented electrical waveform 130, such that the augmented electrical waveform 130 may be supplied (block 226) to the igniter assembly 34. Accordingly, the augmented electrical waveform 130 may supply a burst of electrical energy to the igniter assembly 34 and enable the igniter assembly 34 to generate the pair of plasma plumes 200, which extend into the flow path 70 of the combustor 16. The pair of plasma plumes 200 may facilitate ignition of the fuel-air mixture within the combustor 16. As noted above, the burst of electrical energy supplied to the igniter assembly 34 via the augmented electrical waveform 130 thus defines an ignition event of the igniter assembly 34 (e.g., an attempt of the igniter assembly 34 to ignite the fuel-air mixture). In some embodiments, the waveform generation module 36 may determine (block 228) whether the ignition event (e.g., the burst of electrical energy supplied to the igniter assembly 34 by the augmented electrical waveform 130) initiates combustion (e.g., achieves light-off) within the combustor 16 (e.g., via sensors disposed within or near the combustor 16). If combustion of the fuel-air mixture occurs during the ignition event, the waveform generation module 36 may discontinue (block 230) operation of the igniter assembly 34 by blocking supply of the augmented electrical waveform 130 to the center and/or outer shell electrode 76, 78.

If ignition of the fuel-air mixture does not occur after the burst supplied by the augmented electrical waveform 130, the waveform generation module 36 continues to supply the augmented electrical waveform 130 to the igniter assembly 34. Accordingly, the augmented electrical waveform 130 may supply a subsequent burst of electrical energy to the igniter assembly 34 (e.g., after lapse of the intermissive period 190). The waveform generation module 36 may again determine (block 228) whether ignition of the fuel-air mixture has occurred after the augmented electrical waveform 130 supplies the subsequent burst of electrical energy to the igniter assembly 34. The waveform generation module 36 may repeat blocks 226, 228, and 232 to enable the igniter assembly 34 to generate repeating ignition events until ignition of the fuel-air mixture within the combustor 16 is achieved. After ignition of the fuel-air mixture, the waveform generation module discontinues (block 230) operation of the igniter assembly 34 by blocking the supply of the augmented electrical waveform 130 to the igniter assembly 34.

As noted above, the intermissive period 190 defines a time period between each burst supplied by the augmented electrical waveform 130 to the igniter assembly 34. In some embodiments, the intermissive period 190 may be proportional to a burst frequency of the augmented electrical waveform 130. For example, in some embodiments, a burst frequency of the augmented electrical waveform 130 may be between about 1 Hertz (Hz) and about 4 Hz, such that the augmented electrical waveform 130 intermittently supplies the igniter assembly 34 with an electrical energy input. In other words, the intermissive period 190 between each burst supplied by the augmented electrical waveform 130 to the igniter assembly 34 may be between about 0.25 seconds and about 1 second. However, in other embodiments, the intermissive period 190 may be less than 0.25 seconds or greater than 1 second. For example, the intermissive period 190 may be 0.1 seconds, 3 seconds, 5 seconds, or more than 5 seconds. In addition, it should be noted that a burst frequency of the augmented electrical waveform 130 may be less than 1 Hz or greater than 4 Hz. For example, the burst frequency may include 0.1 Hz or 10 Hz. In any case, a lapse of time between each ignition event generated by the igniter assembly 34 is proportional to magnitude of the intermissive period 190. In some embodiments, the waveform generation module 36 may also adjust a magnitude of the intermissive period 190, and thus a lapse of time between each ignition event, based on a quantity of bursts previously supplied to the igniter assembly 34 by the augmented electrical waveform 130. For example, if ignition of the fuel-air mixture is not achieved after a previous burst, the waveform generation module 36 may decrease a magnitude of the intermissive period 190 after each burst, or after a group of bursts, to enhance an ignition likelihood of the fuel-air mixture.

It should be noted that the waveform generation module 36 may not actively monitor whether ignition is achieved within the combustor 16 in certain embodiments of the method 220. For example, the waveform generation module 36 may be configured to supply the augmented electrical waveform 130 to the igniter assembly 34 for a time interval that may be previously determined (e.g., via empirical trials) to ignite the fuel-air mixture within the combustor 16. Accordingly, the augmented electrical waveform 130 may provide predetermined amount of bursts to the igniter assembly 34, and operation of the igniter assembly 34 may be discontinued thereafter. However, it should be noted that in some embodiments, the augmented electrical waveform 130 may be supplied to the igniter assembly 34 continuously during certain operational periods of the gas turbine system 10. As a non-limiting example, when the gas turbine system 10 is used in an aeronautical setting, the augmented electrical waveform 130 may be supplied to the igniter assembly 34 during take-off or landing periods, if the gas turbine system 10 is ingesting precipitation (e.g., rain water), or during high altitude cruising periods of the gas turbine system 10, throughout which a likelihood of engine flameout may be increased. Additionally or otherwise, the augmented electrical waveform 130 may be supplied to the igniter assembly 34 during any other suitable operational periods of the gas turbine system 10.

Technical effects of the augmented electrical waveform 130 may include reduced wear on the igniter assembly 34 and, particularly, reduced wear on the center and outer shell electrodes 76, 78 of the igniter assembly 34. Accordingly, the augmented electrical waveform 130 may enhance an operational life of the igniter assembly 34 and decrease a frequency of maintenance operations (e.g., removal and replacement of the igniter assembly 34). Further, the augmented electrical waveform 130 may enhance certain capabilities of the gas turbine system 10, such as re-light capabilities of the combustor 16 while the fuel-air mixture is lean or atypically hot.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An igniter assembly for a gas turbine combustor, comprising:
   a first electrode, a second electrode, and an insulator collectively forming a cavity; and
   a waveform generation module electrically coupled to one of the first electrode or the second electrode and configured to supply an electrical waveform comprising a plurality of bursts,
   wherein each burst is supplied to the one of the first electrode or the second electrode to generate an ignition event,
   wherein the plurality of bursts are separated from one another by an intermissive period between sequential bursts,
   wherein each burst consists of a pair of electrical pulses,
   wherein each electrical pulse of the pair of electrical pulses are separated by a pulse spacing between 0.1 milliseconds and 10 milliseconds,
   wherein each electrical pulse of the pair of electrical pulses supplies between 1 Joule and 5 Joules of electrical energy to the one of the first electrode or the second electrode, and wherein the first electrode and the second electrode are configured to ionize gas within the cavity in response to each electrical pulse of the pair of electrical pulses supplied to the one of the first electrode or the second electrode, such that the first electrode and the second electrode generate a pair of ionized gas plumes during each ignition event.

2. The igniter assembly of claim 1, wherein the pair of electrical pulses consists of a first electrical pulse and a second electrical pulse subsequent the first electrical pulse, wherein the first and second electrical pulses comprise a first apex indicative of a first peak electrical current provided by the first electrical pulse and a second apex indicative of a second peak electrical current provided by the second electrical pulse.

3. The igniter assembly of claim 2, wherein the first peak electrical current and the second peak electrical current are each between 0.7 kilo-Amperes and 2 kilo-Amperes.

4. The igniter assembly of claim 3, wherein a first magnitude of the first peak electrical current is greater than a second magnitude of the second peak electrical current.

5. The igniter assembly of claim 1, wherein a pulse duration of each electrical pulse of the pair of electrical pulses is between 3 microseconds and 300 microseconds.

6. The igniter assembly of claim 1, wherein each electrical pulse of the pair of electrical pulses supplies between 1 Joule and 2 Joules of electrical energy to the one of the first electrode or the second electrode.

7. The igniter assembly of claim 6, wherein a first magnitude of electrical energy supplied to the one of the first electrode or the second electrode by a first electrical pulse of the pair of electrical pulses is less than a second magnitude of electrical energy supplied to the one of the first electrode or the second electrode by a second electrical pulse of the pair of electrical pulses.

8. The igniter assembly of claim 1, wherein a burst frequency of the electrical waveform is between 1 Hertz and 4 Hertz.

9. The igniter assembly of claim 1, wherein a first electrical polarity of a first electrical pulse in the pair of electrical pulses is opposite a second electrical polarity of a second electrical pulse in the pair of electrical pulses.

10. A method of operating an igniter assembly for a combustor of a gas turbine engine, comprising:
generating an electrical waveform comprising a plurality of bursts via a waveform generator, wherein the plurality of bursts are separated from one another by an intermissive period between sequential bursts;
supplying the electrical waveform to an electrode of the igniter assembly to generate an ignition event in response to each burst,
wherein each burst consists of a pair of electrical pulses,
wherein each electrical pulse of the pair of electrical pulses are separated by a pulse spacing of less than 10 milliseconds,
wherein each electrical pulse of the pair of electrical pulses supplies between 1 Joule and 5 Joules of electrical energy to the electrode, and
wherein each electrical pulse of the pair of electrical pulses enables the electrode to ionize a gas interspersed between the electrode and an additional electrode disposed adjacent the electrode, such that the electrode generates a pair of ionized gas plumes during the ignition event that expand into a fuel-air mixture within the combustor; and
discontinuing supply of the electrical waveform to the igniter assembly in response to determining that the pair of ionized gas plumes induce light-off of the fuel-air mixture in the combustor.

11. The method of claim 10, further comprising:
in response to determining that the pair of ionized gas plumes do not induce light-off of the fuel-air mixture:
continuing supply of the electrical waveform to the igniter assembly to generate additional ignition events, wherein each ignition event of the additional ignition events is separated from one another by the intermissive period.

12. The method of claim 11, wherein the intermissive period is between 1 second and 4 seconds.

13. The method of claim 10, wherein generating the electrical waveform further comprises providing each electrical pulse of the pair of electrical pulses with a predetermined amount of electrical energy, wherein the predetermined amount of electrical energy is between 1 Joule and 2 Joules.

14. The method of claim 13, further comprising providing each electrical pulse of the pair of electrical pulses for a predetermined pulse duration, wherein the predetermined pulse duration is between 10 microseconds and 100 microseconds.

15. The method of claim 13, further comprising providing each electrical pulse of the pair of electrical pulses for a predetermined pulse duration, wherein the predetermined pulse duration is greater than 200 microseconds.

16. An igniter assembly for a gas turbine system, comprising:
a pair of electrodes surrounding an insulator,
wherein the pair of electrodes and the insulator form a cavity comprising an outlet passage,
wherein the igniter assembly is configured to couple to the gas turbine system to extend into a flow path of the gas turbine system,
wherein the pair of electrodes are configured to ionize a gas within the cavity in response to an electrical current applied to a first electrode of the pair of electrodes and wherein plumes of the ionized gas are exhausted through the outlet passage; and
a waveform generation module configured to supply the electrical current to the electrode as an electrical waveform comprising a plurality of bursts, wherein the plurality of bursts are separated from one another by an intermissive period between sequential bursts, wherein each burst defines an ignition event and consists of a pair of electrical pulses, wherein each electrical pulse of the pair of electrical pulses are separated from one another by a pulse spacing of less than 10 milliseconds, wherein each electrical pulse of the pair of electrical pulses supplies between 1 Joule and 5 Joules of electrical energy to the first electrode of the pair of electrodes, and wherein each electrical pulse is configured such that the pair of electrodes generates a respective plume of the ionized gas that exhausts through the outlet passage, such that the ignition event generates a pair of ionized gas plumes disposed proximate to one another and each corresponding to a respective electrical pulse of the pair of electrical pulses.

17. The igniter assembly of claim 16, wherein each electrical pulse of the pair of electrical pulses provides a predetermined amount of electrical energy to the first electrode of the pair of electrodes, wherein the predetermined amount of electrical energy is between 1 Joule and 2 Joules.

18. The igniter assembly of claim 16, wherein each electrical pulse of the pair of electrical pulses comprises a peak electrical current discharge between 0.7 kilo-Amperes and 2 kilo-Amperes.

19. The igniter assembly of claim 16, further comprising an additional intermissive period separating each electrical pulse of the pair of electrical pulses from one another, wherein the additional intermissive period is between 10 microseconds and 100 microseconds.

20. The igniter assembly of claim 16, wherein each electrical pulse of the pair of electrical pulses comprises a pulse duration between 250 microseconds and 500 microseconds.

\* \* \* \* \*